United States Patent
Sevindik et al.

(10) Patent No.: US 9,668,238 B1
(45) Date of Patent: May 30, 2017

(54) MULTICAST FILE DELIVERY

(71) Applicant: Sprint Spectrum LP, Overland Park, KS (US)

(72) Inventors: Volkan Sevindik, Reston, VA (US); Yu Zhou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 142 days.

(21) Appl. No.: 14/504,571

(22) Filed: Oct. 2, 2014

(51) Int. Cl.
 *H04W 4/18* (2009.01)
 *H04W 72/00* (2009.01)
 *H04L 29/08* (2006.01)

(52) U.S. Cl.
 CPC ....... *H04W 72/005* (2013.01); *H04L 67/1095* (2013.01)

(58) Field of Classification Search
 CPC ...................... H04W 72/005; H04W 4/06–4/08
 USPC ............... 370/230, 241, 312, 390; 707/691; 709/219; 714/15, 16, 18
 See application file for complete search history.

(56) References Cited

U.S. PATENT DOCUMENTS

| | | | |
|---|---|---|---|
| 8,780,907 B2 | 7/2014 | Kotecha | |
| 2012/0151261 A1* | 6/2012 | Suneya | H04L 1/0009 714/18 |
| 2014/0095730 A1 | 4/2014 | Ozgur | |
| 2014/0358866 A1* | 12/2014 | Gholmieh | G06F 17/30371 707/691 |
| 2015/0189544 A1* | 7/2015 | Chen | H04L 1/08 370/230 |
| 2015/0278022 A1* | 10/2015 | Chen | H04W 4/06 714/15 |

* cited by examiner

*Primary Examiner* — Charles C Jiang
*Assistant Examiner* — Wali Butt (57) ABSTRACT

The process of multicasting a file to a group of wireless devices is divided into a number of time intervals of roughly equal duration. After each interval, the wireless devices report information about the wireless device's reception of the portion of the file sent during the preceding interval. If the number of wireless devices that received erroneous file fragments is higher than some threshold, the number of times each packet is redundantly transmitted is increased for the multicasting of another portion of the file to be sent during another interval.

15 Claims, 5 Drawing Sheets

MULTICAST FILE DELIVERY

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

The significant expansion of wireless communication networks has enabled many services and applications that use wireless devices. Some of these services involve the transmission of multimedia content or large files to a large number of users simultaneously. These types of services can be characterized as being a one-to-many transmission model (as opposed to a one-to-one transmission model—a.k.a., unicast). The one-to-many transmission model (a.k.a., broadcast or multicast) allows multiple users to receive the same data simultaneously via a wireless over the air interface.

OVERVIEW

In an embodiment, a method of operating a communication system includes multicasting, over a selected time interval, a first file fragment of a file to a plurality of wireless devices using a wireless link. This first fragment is multicast using a first level of packet duplication. A first plurality of reception reports associated with the first file fragment is received from the plurality of wireless devices. In response to the plurality of reception reports meeting a threshold criteria, a second file fragment of the file is multicast, over the selected time interval, to the plurality of wireless devices using using a second level of packet duplication.

In an embodiment, a method of multicasting a file to a plurality of wireless devices includes selecting a time duration based on air-interface conditions associated with the plurality of wireless devices. Over a first period of time having the time duration, a first portion of the file is wirelessly multicast to the plurality of wireless devices using a first selected amount of packet duplication. A first plurality of reception information reports associated with reception of the first portion of the file during the first period of time are received from the plurality of wireless devices. In response to the first plurality of reception information reports indicating the first portion of the file was received with errors by a threshold number of the plurality of wireless devices, a second amount of packet duplication is selected. Then, over a second period of time having the time duration, a second portion of the file is multicast to the plurality of wireless devices using the second selected amount of packet duplication.

In an embodiment, a communication system comprises an access node configured to receive a first set of reception information reports. The reception information reports are associated with a first portion of a file that has been multicast to a plurality of wireless devices. The first portion of the file having been multicast by the access node using a first level of packet duplication. The communication system also includes a processing node configured to receive the first set of reception information reports. The processing node, in response to first set of reception information reports meeting a threshold criteria, configures the access node to multicast a second portion of the file using a second level of packet duplication.

DETAILED DESCRIPTION

In an embodiment, the process of multicasting a file to a group of wireless devices is divided into a number of time intervals of roughly equal duration. For example, a file delivery that is expected to take five minutes can be divided into five (5) one minute intervals, ten (10) thirty-second intervals, etc. Each of these intervals may correspond to a portion (or fragment) of the file.

After each interval, the wireless devices report information about their reception of the portion of the file sent during the preceding interval. If a threshold percentage (or number) of wireless devices report they experienced poor reception, the number of times a packet is transmitted is increased. In other words, if the number of wireless devices that received erroneous file fragments is higher than some threshold, the number of times each packet is redundantly transmitted is increased. Likewise, when the number of wireless devices that receive erroneous file fragments is lower than some threshold, the number of times each packet is redundantly transmitted can be decreased. In this manner, the number of wireless devices that need to establish a one-to-one (i.e., unicast) connection in order to receive missing or erroneous file segments is reduced.

Figure 1:
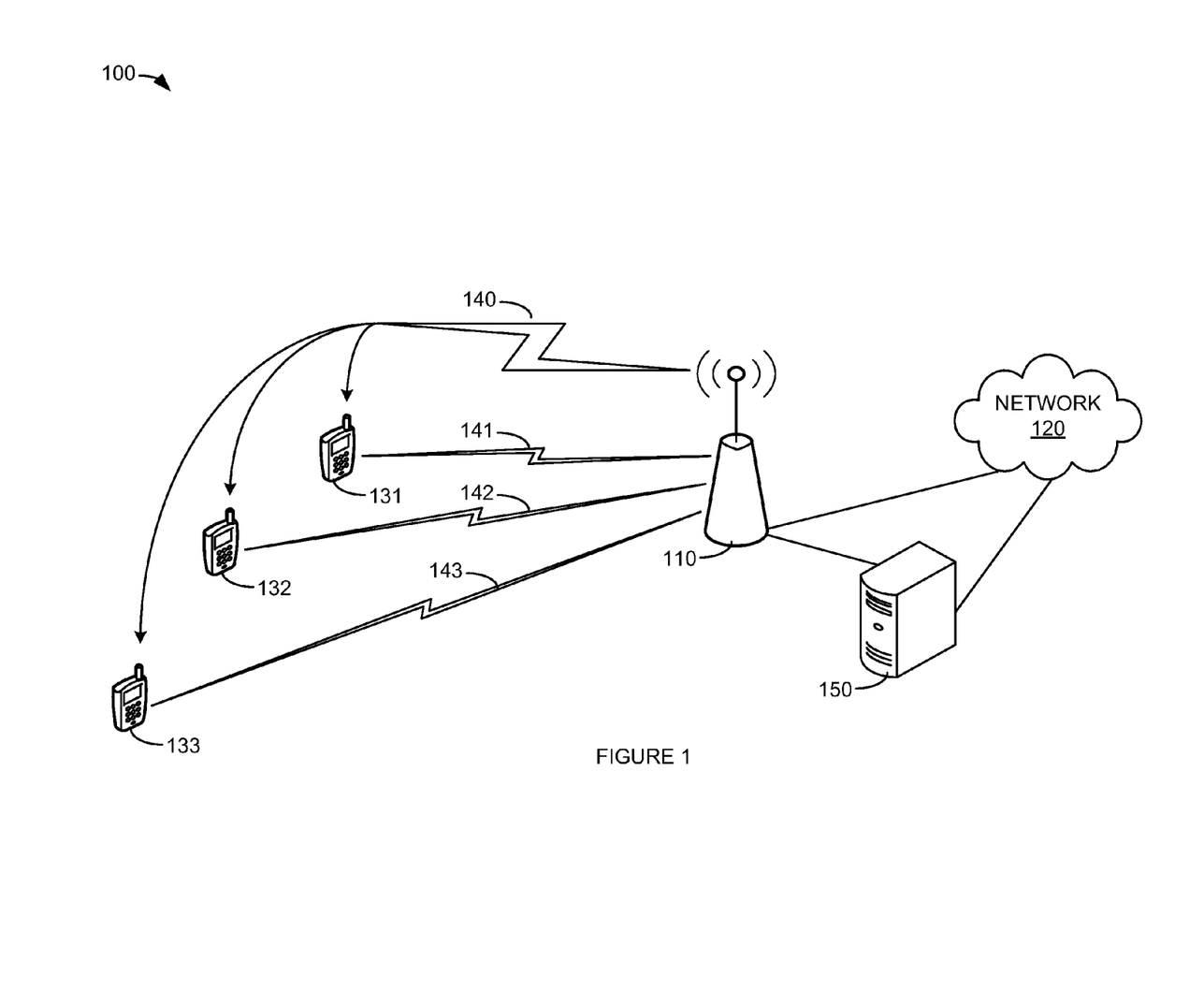
FIG. 1 is a block diagram illustrating a communication system.

FIG. 1 is a block diagram illustrating a communication system. In FIG. 1, communication system 100 comprises access node 110, network 120, wireless device 131, wireless device 132, wireless device 133, and processing node 150.

Access node 110 is operatively coupled to network 120 and processing node 150. Access node 110 is operatively coupled to multicast (broadcast) data to wireless devices 131-133 via multicast wireless link 140. Wireless device 131 can establish a bidirectional unicast session with access node 110 via wireless link 141. Wireless device 132 can establish a bidirectional unicast session with access node 110 via wireless link 142. Wireless device 133 can establish a bidirectional unicast session with access node 110 via wireless link 142. Processing node 150 is operatively coupled to network 120.

Communication system 100 is a communication network that can provide wireless communication to wireless devices 131-133. Network 120 is a communication network that can provide communication between access node 110 and other wired or wireless networks. Communication system 100 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 can also comprise wireless networks, including base station, wireless communication nodes, telephony switches, internet routers, network gateways, computer systems, communication links, or some other type of communication equipment, and combinations thereof.

Wired network protocols that may be utilized by communication system 100 and/or network 120 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 and/or network 120 may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between access node 110 and network 120 can be, for example, twisted pair cable, coaxial cable or fiber optic cable, or combinations thereof. Wireless links 140-143 can be a radio frequency, microwave, infrared, or other similar signal that uses orthogonal frequency division multiplexing (OFDM). Wireless links 140-143 can use a suitable communication protocol, for example, Worldwide Interoperability for Microwave Access (WiMAX), or Long Term Evolution (LTE), or combinations thereof. Other wireless protocols can also be used.

Other network elements may be present in communication system 100 (and present in wireless network 120, in particular) to facilitate wireless communication to/from wireless devices 131-133 but are omitted for clarity, such as base stations, base station controllers, gateways, mobile switching centers, dispatch application processors, and location registers such as a home location register or visitor location register. Furthermore, other network elements may be present to facilitate communication between access node 110 and network 120 which are omitted for clarity, including additional processing nodes, routers, gateways, and physical and/or wireless data links for carrying data among the various network elements.

Wireless devices 131-133 may be any devices, systems, combination of devices, or other such communication platforms capable of communicating wirelessly with access node 110. One or more of wireless devices 131-133 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data with via access node 110, and network 120. Other types of communication platforms are possible.

Wireless devices 131-133 may establish communication sessions with access node 110 in order to receive communication service. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

Access node 110 is a network node capable of providing wireless communication to wireless devices 131-133. Access node 110 can be, for example, a base transceiver station, a radio access node, a NodeB device, or an enhanced NodeB (eNodeB) device. Access node 110 can communicate information, such as data files, to wireless devices via multicast wireless link 140. Access node 110 can communicate information to and/or from wireless devices 131-133 via wireless links 141-143, respectively. Access node 110 may forward data (e.g., operating system files) and/or multimedia data (e.g., audio, video, A/V, or other multimedia content) received from network 120 to wireless devices 131-133 via multicast wireless link 140. In an embodiment, multicast wireless link 140 conforms to the Multimedia Broadcast Multicast Service (MBMS) and/or enhanced Multimedia Broadcast Multicast Service (eMBMS) specification.

Processing node 150 may perform certain functions related to allocation of air-interface resources (e.g., resource blocks in an LTE specified system) used by access node 110 or other access nodes (not shown in FIG. 1). In addition to determining the allocation of air interface resources in the time and frequency domain, processing node 150 may determine further details of the air interface configuration used by access node 110. For example processing node 150 may determine the modulation and coding scheme used by multicast wireless link 140. In an embodiment, processing node 150 may be, or be part of, access node 110.

In an embodiment, communication system 100 uses the File Delivery over Unidirectional Transport (FLUTE) protocol to deliver files received from network 120 to wireless devices 131-133 via multicast wireless link 140. The FLUTE protocol divides a file into packets and associates each packet with a file identification number. The FLUTE protocol is specified in RFC 6726 available from The Internet Engineering Task Force (ietf.org). These packets are sent to all wireless devices 131-133 simultaneously via multicast wireless link 140. A wireless device 131-133 that does not receive the complete file, or receives the file with some errors, proceeds to perform a file recovery process. During this file recovery process the wireless device 131-133 will request erroneous or missing packets using the file identification number. Wireless device 131-133 establishes a unicast link 141-143, respectively, in order to request the missing/erroneous packets and to receive the parts of the file (i.e., packets) a respective wireless device 131-133 is missing.

In an embodiment, communication system 100 divides the process of multicasting a file via multicast wireless link 140 to wireless devices 131-133 into a number of time intervals of equal or roughly equal duration. For example, communication system 100 can divide the multicasting of a file via multicast link 140 into thirty-second intervals, one minute intervals, etc. Each of these intervals may correspond to a portion (or fragment) of the file. Each of these file portions may be delivered using the FLUTE protocol. The FLUTE protocol may provide the information necessary to reassemble the entire file from the file portions. In an embodiment, communication system 100 may select the size of the file portions, or the interval, based on air-interface conditions reported by wireless devices 131-133. In another embodiment, communication system 100 may select the size of the file portions, or the interval, based on reports from wireless devices 131-133 about the reception of previous file portions.

After each interval or file portion, wireless devices 131-133 report information to access node 110 and processing node 150 about their reception of the portion of the file sent during the preceding interval. Wireless devices 131-133 can report information to access node 110 and processing node 150 about their reception of the portion of the file using wireless links 141-143. Based on these reports from wireless devices 131-133, communication system 100 determines whether a threshold number (or percentage) of wireless devices 131-133 did not receive the file portion without errors (or less than a selected amount of errors).

If communication system 100 determines a threshold percentage (or number) of wireless devices 131-133 report the file portion was received with an error(s), processing node 150 selects an increased number of times to transmit each packet during the next interval (file portion). In other words, if the number of wireless devices 131-133 that received erroneous file fragments is higher than a selected threshold, the number of times each packet is redundantly transmitted by access node 110 is increased by processing node 150. Likewise, when the number of wireless devices 131-133 that received erroneous file fragments is lower than some threshold, the number of times each packet is redundantly transmitted by access node 110 can be decreased by processing node 150. Access node 110 may be configured to multicast the redundant copies of the packets with a time delay between the copies. In this manner, time diversity between the redundant copies is improved.

For example, for a first portion of a file (i.e., interval), processing node 150 may configure access node 110 to send each packet only once. If, based on the reception information reports received from wireless devices 131-133, it is determined that a threshold percentage or more (e.g., >1%) of wireless devices 131-133 report the file portion was received with an error, processing node 150 would elect to increase the number of times to transmit each packet during the next interval to two. Thus, for a second portion of a file (i.e., interval), processing node 150 would configure access node 110 to send each packet twice. If, after multicasting the second portion of the file, the reception information reports received from wireless devices 131-133 indicate that the threshold percentage or more (e.g., >1%) of wireless devices 131-133 report the file portion was received with an error, processing node 150 would increase the number of times to transmit each packet during the third interval to three, and so on.

Communication system 100 may also reduce the number of times a packet is sent redundantly when another threshold condition is met. For example, for a portion of a file (i.e., interval) access node 110 may be configured to send each packet four times. If, based on the reception information reports received from wireless devices 131-133, it is determined that a threshold percentage or less (e.g., <0.01%) of wireless devices 131-133 report the file portion was received with an error, processing node 150 can elect to decrease the number of times to transmit each packet during the next interval to three.

Figure 2:
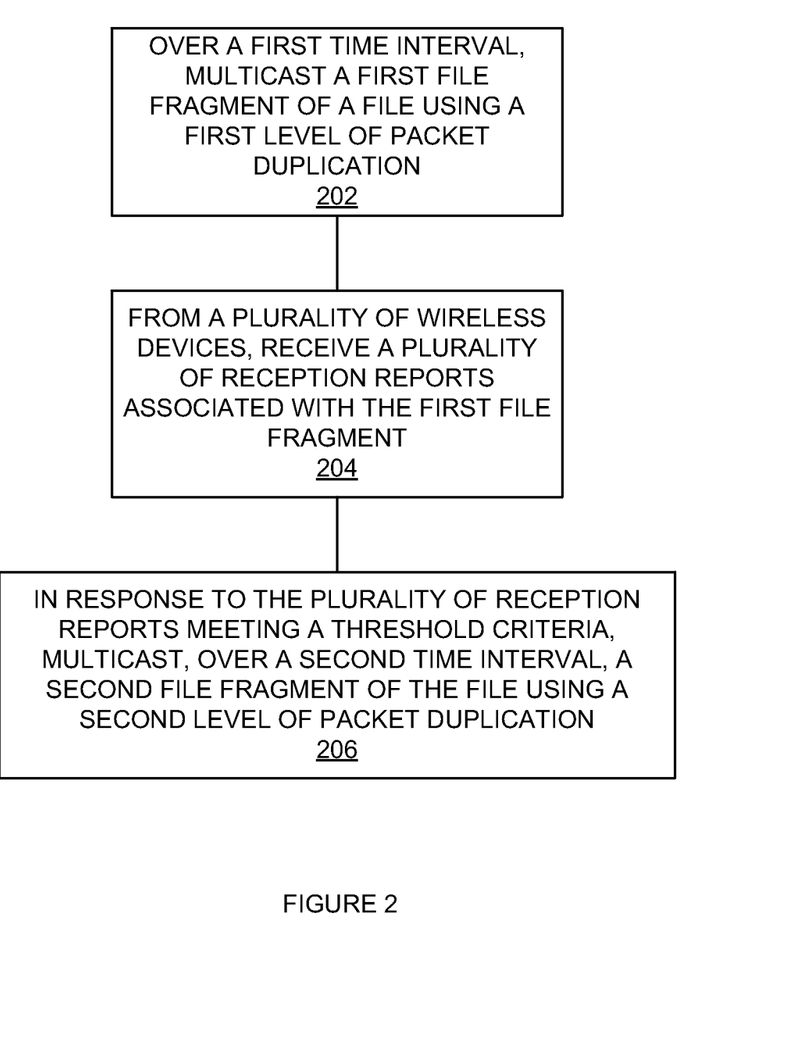
FIG. 2 is a flowchart illustrating a method of operating a communication system.

FIG. 2 is a flowchart illustrating a method of operating a communication system. The steps illustrated in FIG. 2 may be performed by one or more elements of communication system 100. Over a first time interval, a first file fragment of a file is multicast using a first level of packet duplication (202). For example, over a first time interval (e.g., 30 sec.), a first portion of a file (e.g., the first 1 MB of a 5 MB file) is multicast by access node 110 to wireless devices 131-133 using multicast wireless link 140. Each packet of the first portion of the file may be transmitted by access node 110 only once. The file may be fragmented and each portion multicast in accordance with the FLUTE protocol.

From a plurality of wireless devices, a plurality of reception reports associated with the first file fragment are received (204). For example, after the first time interval, wireless devices 131-133 may report to access node 110 reception information, receptions statistics, reception performance, and/or error indicator(s) associated with each respective wireless device's 131-133 reception of the first file fragment. Wireless devices 131-133 may use wireless links 141-143 to report the reception information, receptions statistics, reception performance, and/or error indicator(s) associated with each respective wireless device's 131-133 reception of the first file fragment to access node 110 and/or processing node 150.

In response to the plurality of reception reports meeting a threshold criteria, over a second time interval, a second file fragment of the file is multicast using a second level of packet duplication (206). For example, over a second time interval (e.g., second 30 sec.), a second portion of a file (e.g., the second 1 MB of a 5 MB file) is multicast by access node 110 to wireless devices 131-133 using multicast wireless link 140. Each packet of the second portion of the file may be transmitted by access node 110 twice.

Figure 3:
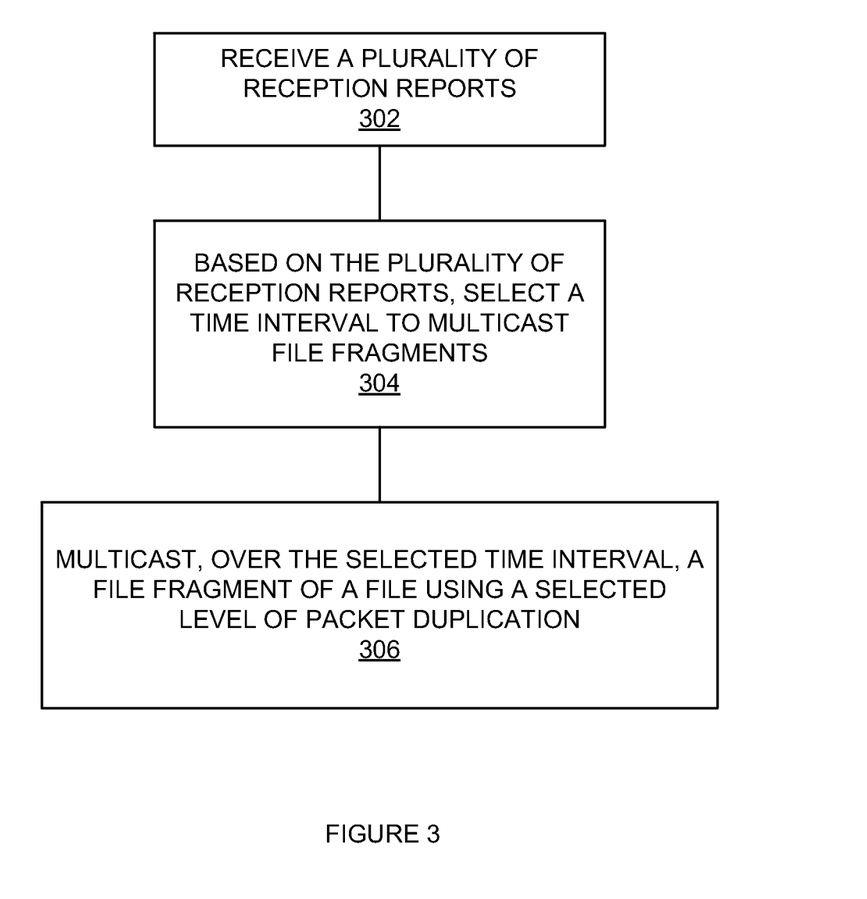
FIG. 3 is a flowchart illustrating a method of multicasting a file fragment.

FIG. 3 is a flowchart illustrating a method of multicasting a file fragment. The steps illustrated in FIG. 3 may be performed by one or more elements of communication system 100. A plurality of reception reports are received (302). For example, access node 110 may receive reception information reports from each of wireless devices 131-133. These reception information reports may include an indicator of air-interface conditions, receptions statistics, reception performance, and/or error indicator(s) associated with each respective wireless device 131-133. These reception information reports may include an indicator of air-interface conditions, receptions statistics, reception performance, and/or error indicator(s) associated with each respective wireless device's 131-133 reception of a previously multicast file fragment.

Based on the plurality of reception reports, a time interval to multicast file fragments is selected (304). For example, based on the reception information reports received by access node 110, communication system 100 may select a time interval (or file portion size) that is to be used as the increment to divide-up the multicasting of a file. For example, a file delivery that is estimated by communication system 100 to take 5 minutes can be divided up into 15 second intervals, 30 second interval, one minute intervals, etc. The selection of the interval can be made based on the reception information reports received by access node 100.

Typically, if the reception information reports indicate air-interface conditions (or reception) are poor, a shorter interval will be selected than if the reception information reports indicate air-interface conditions (or reception) are good or excellent. Information from the reception information reports may be averaged across wireless devices 131-133 in order to select the interval. For example, received signal strength indicators (RSSI) received from wireless devices 131-133 may be averaged to produce a single RSSI number which is then used to select the time interval (or file portion size) that is to be used as the increment to divide-up the multicasting of a file.

Over the selected time interval, a file fragment of a file is multicast using a selected level of packet duplication (306). For example, access node 110 may multicast a first portion of a file by transmitting each packet multiple times via multicast wireless link 140. Each copy of a packet may be transmitted with a delay between copies in order to improve time diversity. The number of times each packet is redundantly transmitted may be selected by communication system 100 based on the reception reports received by access node 110 from wireless devices 131-133.

Figure 4:
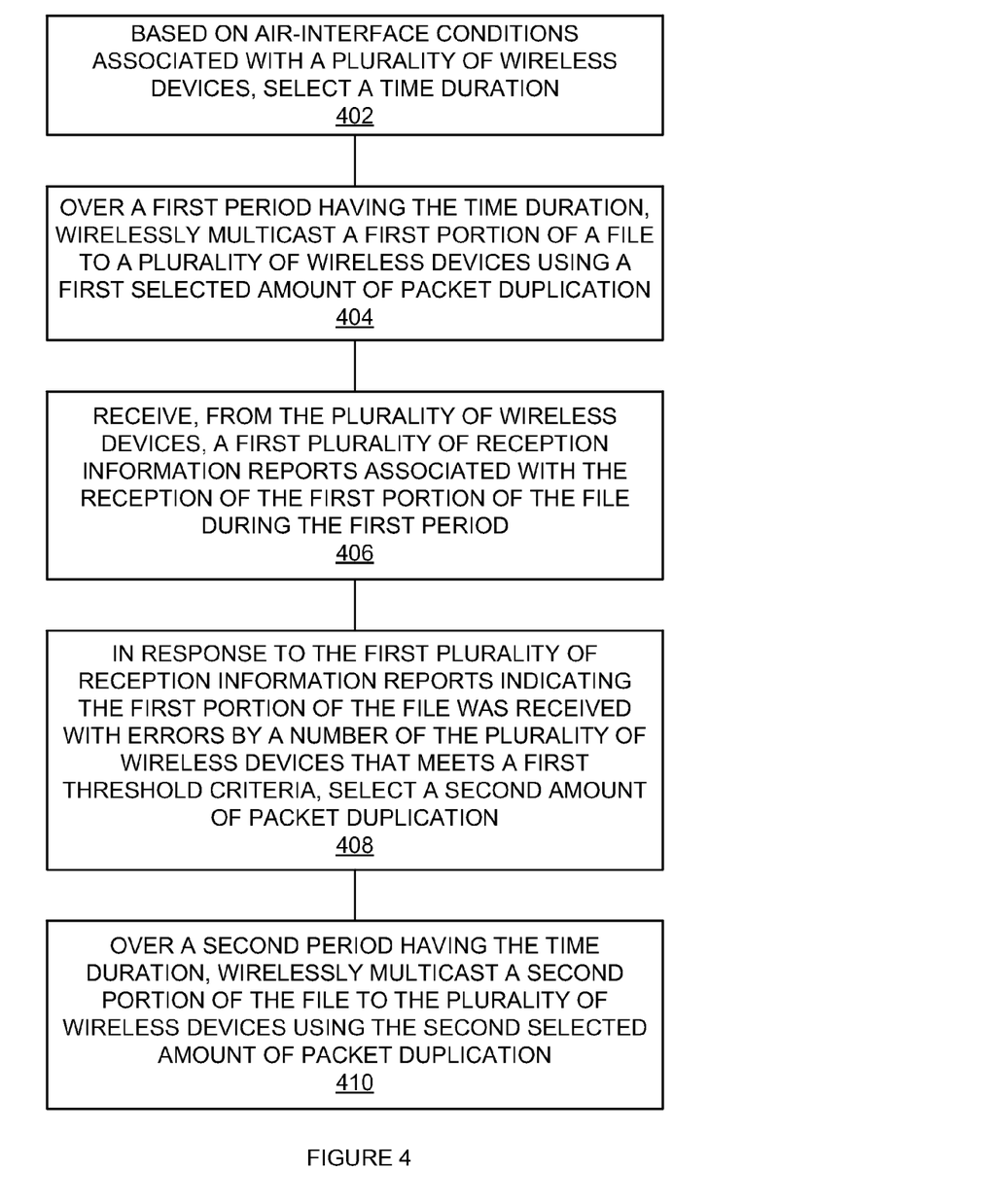
FIG. 4 is a flowchart illustrating a method of multicasting portions of a file.

FIG. 4 is a flowchart illustrating a method of operating a communication system. The steps illustrated in FIG. 4 may be performed by one or more elements of communication system 100. Based on air-interface conditions associated with a plurality of wireless devices, select a time duration (402). For example, based on air-interface conditions reported by wireless devices 131-133, and received by access node 110, communication system 100 may select a transmission time duration (or file portion size) that is to be used as the increment to divide-up the multicasting of a file. Typically, if the wireless devices 131-133 indicate the air-interface conditions (or reception) are poor for multicast wireless link 140, a shorter time duration will be selected than if wireless devices 131-133 indicate the air-interface conditions (or reception) are good or excellent. Indicators of air-interface conditions may be averaged across wireless devices 131-133 in order to select the duration. For example, received signal strength indicators (RSSI) associated with wireless devices 131-133 may be averaged to produce a single RSSI number. This single RSSI number can then be used to select the duration (or file portion size) that is to be used as the increment to divide-up the multicasting of a file.

Over a first period having the time duration, a first portion of a file is wirelessly multicast to a plurality of wireless devices using a first selected amount of packet duplication (404). For example, over a period of time corresponding to the selected time duration, access node 110 may multicast to wireless devices 131-133 a portion of a file. Access node 110 may multicast this portion of the file by repeating the transmission of each packet of the file portion via multicast wireless link 140 a selected number of times (e.g., 3 times).

From the plurality of wireless devices, a first plurality of reception information reports associated with the reception of the first portion of the file during the first period is received (406). For example, access node 110 may receive, from wireless devices 131-133, respective reception reports associated with the portion of the file multicast by repeating the transmission of each packet the selected number of times during the first period. These reception information reports may include an indicator of air-interface conditions, receptions statistics, reception performance, and/or error indicator(s) associated with each respective wireless device's 131-133 reception of the file portion during the first period while the file portion was being multicast by repeating the transmission of each packet the selected number of times.

In response to the first plurality of reception information reports indicating that the first portion of the file was received with errors by a number of the plurality of wireless devices that meets a first threshold criteria, a second amount of packet duplication is selected (408). For example, when the reception information reports indicate that a threshold percentage or more (e.g., >1%) of wireless devices 131-133 report the file portion was received with an error, processing node 150 can select an increased number of times to repeat the transmission of each packet (e.g., from being repeated 3 times to being repeated 4 times) while multicasting another portion of the file.

Over a second period having the time duration, a second portion of the file is multicast to the plurality of wireless device using the second selected amount of packet duplication (410). For example, during the multicasting of a different portion of the file by access node 110 via multicast wireless link 140, access node 110 may repeat the transmission of each packet of the file portion an increased (or decreased) number of times (e.g., 4 times). While transmitting the second portion of the file, access node 110 may repeat the transmission of each packet of the file portion the number of times selected in box 408.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, network 120, wireless device 131, wireless device 132, wireless device 133, wireless device 126, and/or processing node 150.

Figure 5:
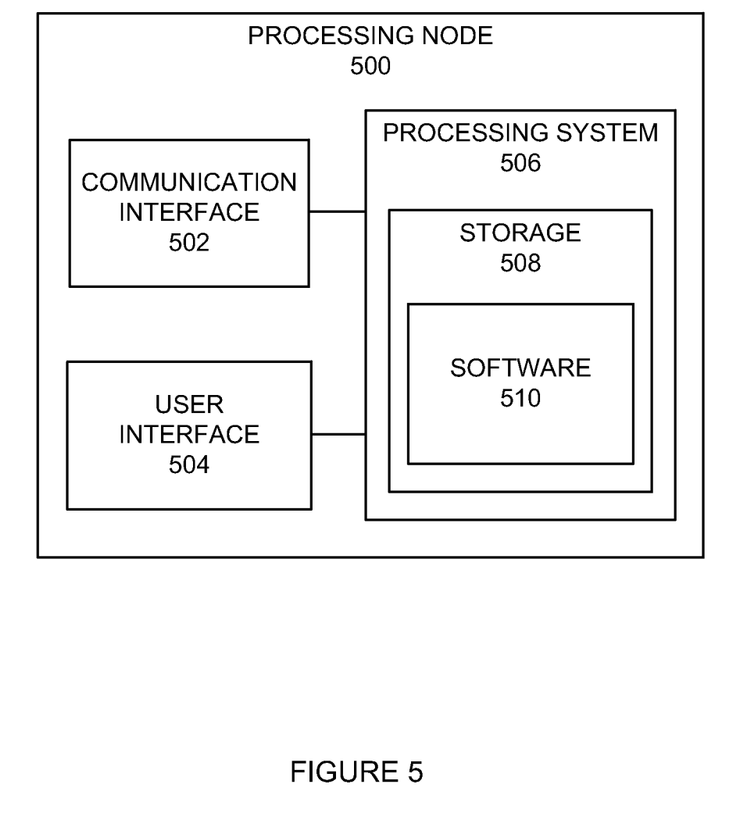
FIG. 5 illustrates a processing node.

FIG. 5 illustrates an exemplary processing node 500 comprising communication interface 502, user interface 504, and processing system 506 in communication with communication interface 502 and user interface 504. Processing node 500 is capable of paging a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples example of processing node 500 includes access node 110, network 120, wireless device 131, wireless device 132, wireless device 133, wireless device 126, and/or processing node 150. Processing node 500 can also be an adjunct or component of a network element, such as an element of access node 110, network 120, wireless device 131, wireless device 132, wireless device 133, wireless device 126, processing node 150, a mobility management entity, a gateway, a proxy node, and/or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
    multicasting, over a first selected time interval, a first file fragment of a file to a plurality of wireless devices using a wireless link and using a first level of packet duplication, wherein the first selected time interval is selected based on air-interface conditions associated with the plurality of wireless devices,
    receiving, from the plurality of wireless devices, a first plurality of reception reports associated with the first file fragment;
    in response to the plurality of reception reports meeting a threshold criteria, multicasting, over the first selected time interval, a second file fragment of the file to the plurality of wireless devices using the wireless link and using a second level of packet duplication;
    receiving, from the plurality of wireless devices, a second plurality of reception reports associated with the second file fragment; and
    in response to the second plurality of reception reports meeting the threshold criteria, multicasting, over the first selected time interval, a third file fragment of the file to the plurality of wireless devices using the wireless link and using a third level of packet duplication.

2. The method of claim 1, further comprising:
    selecting a second selected time interval based on the second plurality of reception reports; and,
    multicasting, over the second selected time interval, the second file fragment of the file to the plurality of wireless devices using the wireless link and using the first level of packet duplication.

3. The method of claim 1, wherein said first level of packet duplication corresponds to a minimum level of packet duplication.

4. The method of claim 3, wherein said second level of packet duplication corresponds to transmitting, over the first selected time interval, a first copy of a packet and a second copy of the packet.

5. The method of claim 4, wherein the first copy of the packet and the second copy of the packet are transmitted with a selected delay between the transmission of the first copy of the packet and the second copy of the packet.

6. The method of claim 3, wherein said second level of packet duplication corresponds to transmitting, over the first selected time interval, a first copy of a packet, a second copy of the packet, and a third copy of the packet.

7. A method of multicasting a file to a plurality of wireless devices, comprising:
    based on air-interface conditions associated with the plurality of wireless devices, selecting a time duration;
    over a first period of time having the time duration, wirelessly multicasting a first portion of the file to the plurality of wireless devices using a first selected amount of packet duplication;
    receiving, from the plurality of wireless devices, a first plurality of reception information reports associated with reception of the first portion of the file during the first period of time;
    in response to the first plurality of reception information reports indicating the first portion of the file was received with errors by a number of the plurality of wireless devices that meets a first threshold criteria, selecting a second amount of packet duplication;
    over a second period of time having the time duration, wirelessly multicasting a second portion of the file to the plurality of wireless devices using the second selected amount of packet duplication;
    receiving, from the plurality of wireless devices, a second plurality of reception information reports associated with reception of the second portion of the file during the second period of time;
    in response to the second plurality of reception information reports indicating the second portion of the file was received with errors by the number of the plurality of wireless devices that meet the first threshold criteria, selecting a third amount of packet duplication; and
    over a third period of time having the time duration, wirelessly multicasting a third portion of the file to the plurality of wireless devices using the third selected amount of packet duplication.

8. The method of claim 7, wherein the first selected amount of packet duplication corresponds to sending each packet one time over the time duration.

9. The method of claim 8, wherein the second selected amount of packet duplication corresponds to sending each packet twice over the time duration.

10. The method of claim 7, wherein the third selected amount of packet duplication corresponds to sending each packet three times over the time duration.

11. The method of claim 7, wherein the time duration is selected based on air-interface condition reports received from the plurality of wireless devices.

12. A communication system, comprising:
    an access node configured to receive a first set of reception information reports associated with a first portion of a file being multicast to a plurality of wireless devices by the access node using a first level of packet duplication over a first period of time having a time duration selected based on air-interface conditions associated with the plurality of wireless devices and, a processing node configured to receive the first set of reception information reports and, in response to first set of reception information reports meeting a threshold criteria, configure the access node to multicast a second portion of the file using a second level of packet duplication, wherein the access node is further configured to receive a second set of reception information reports associated with the multicast of the second portion of the file to the plurality of wireless devices, and wherein the processing node is further configured to receive the second set of reception information reports and, in response to the second set of reception information reports meeting the threshold criteria, configure the access node to multicast a third portion of the file using a third level of packet duplication.

13. The communication system of claim 12, wherein the processing node is further configured to select, based on the air-interface conditions, a time duration that the second portion of the file is to be multicast to the plurality of wireless device by the access node.

14. The communication system of claim 12, wherein the first level of packet duplication corresponds to multicasting each packet containing the first portion of the file a single time.

15. The communication system of claim 12, wherein the second level of packet duplication corresponds to multicasting each packet containing the second portion of the file two times.

* * * * *